May 6, 1930. H. A. TUTTLE 1,757,026
GEARING MECHANISM
Filed April 4, 1927  2 Sheets-Sheet 1
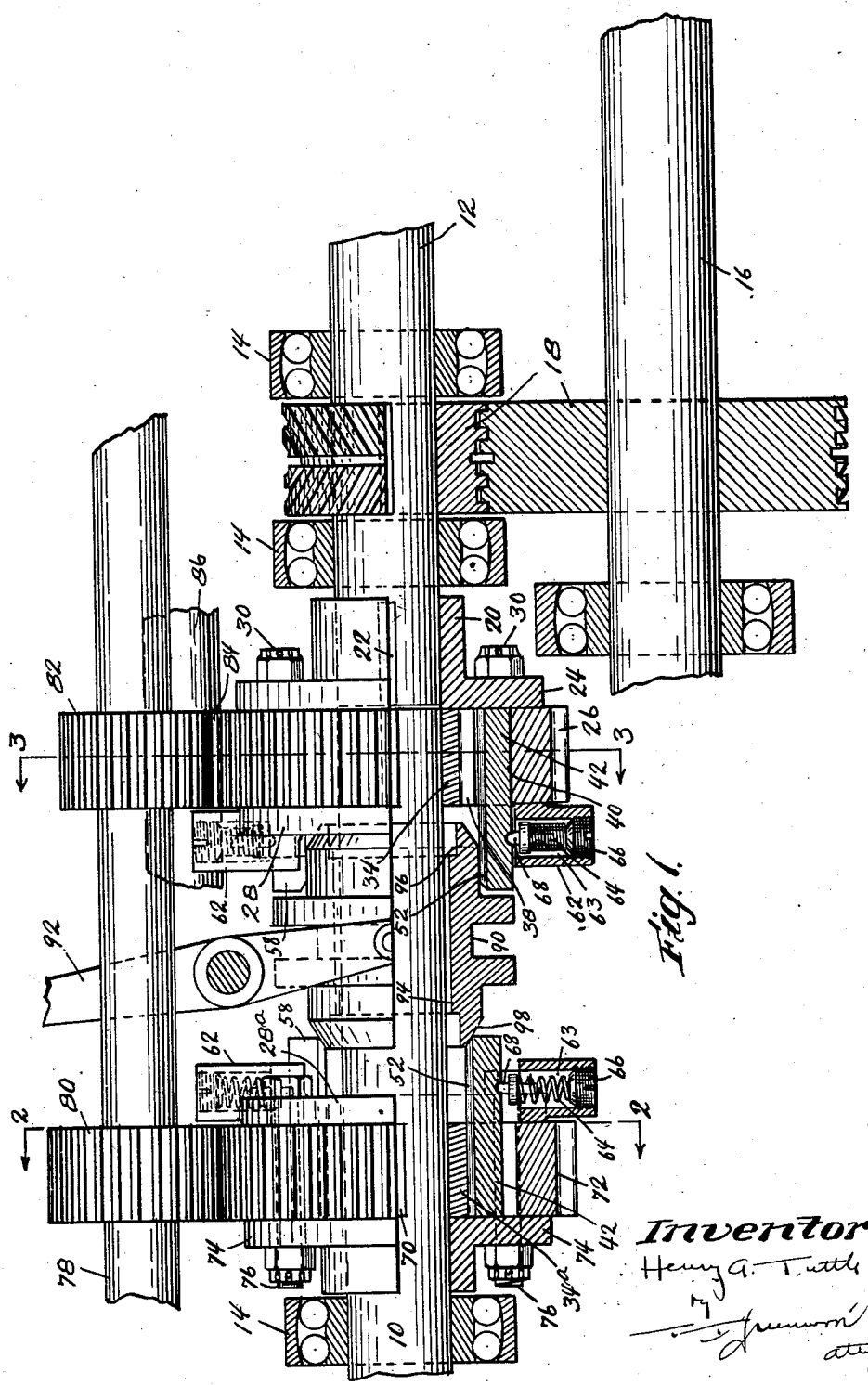

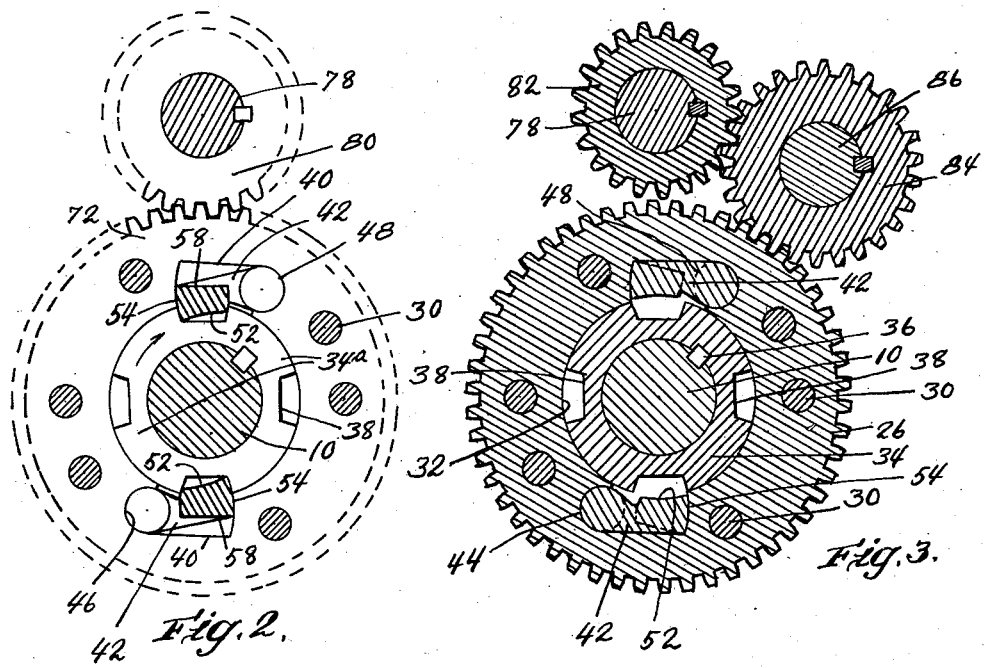
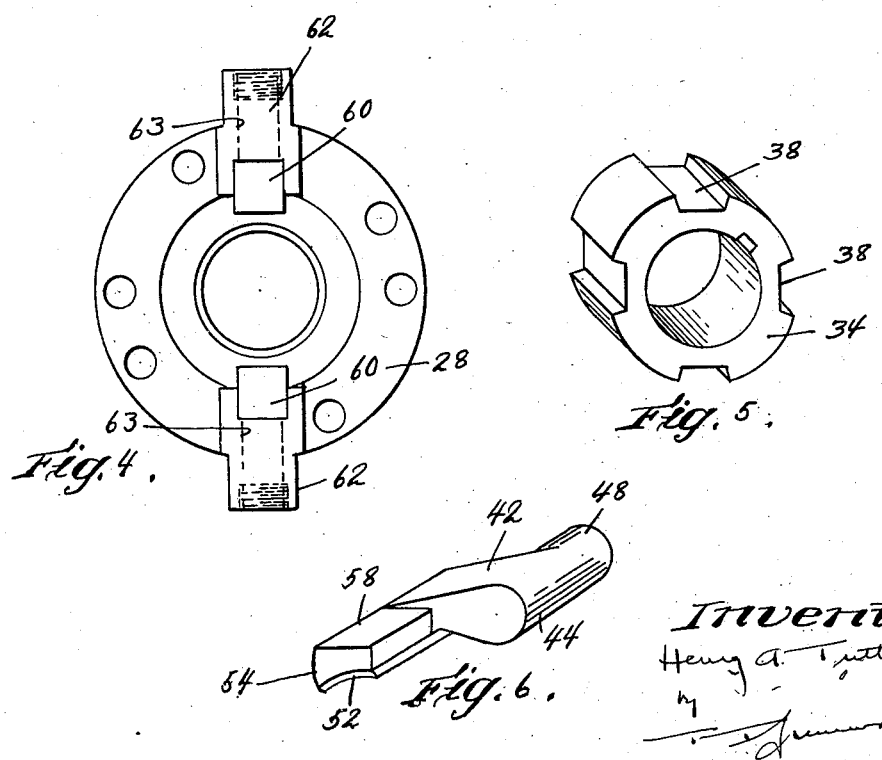

Patented May 6, 1930

1,757,026

UNITED STATES PATENT OFFICE

HENRY A. TUTTLE, OF UPTON, MASSACHUSETTS; JENNIE L. TUTTLE EXECUTRIX OF SAID HENRY A. TUTTLE, DECEASED

GEARING MECHANISM

Application filed April 4, 1927. Serial No. 180,702.

This invention relates to gearing mechanism of the type having clutching mechanism to connect a driving and a driven shaft directly together for forward drive and gearing to connect the shafts for the reverse drive of the driven shaft. The gearing mechanism is especially adapted, although not necessarily limited, to boat propulsion wherein the driving shaft is usually the engine shaft and the driven shaft usually is, or is connected with, the propeller shaft.

An object of this invention is the provision of clutch mechanism to connect the driving and driven shafts positively together for forward drive and to eliminate the usual friction clutch heretofore employed in marine propulsion for this purpose.

A further object of the invention is the provision of clutch mechanism, and preferably positive clutch mechanism, to connect the reverse gearing with one of said shafts as the driving shaft, to condition the gearing for the reverse drive of the driven shaft.

A yet further object of the invention is operating mechanism for both clutch mechanisms so arranged that in one position thereof it holds both clutch mechanisms in inoperative position so that the driving and driven shafts are free from positive interconnection, and also so arranged that movement of the operating mechanism in opposite directions from the aforesaid position serves to operate each mechanism separately.

A yet further object of the invention is an improved form of positive clutch mechanism.

Another object is generally to improve the construction and operation of gearing mechanisms.

Claims drawn more specifically to the arrangement of the clutch mechanism are contained in my concurrently filed application S. N. 180,703.

Fig. 1 is a side elevation of the gearing mechanism embodying the invention partly in section with parts not essential to the invention omitted.

Fig. 2 is a section along line 2—2 of Fig. 1.

Fig. 3 is a section along line 3—3 of Fig. 1.

Fig. 4 is an end view of the cover plate for the clutch mechanism.

Fig. 5 is a perspective view of a clutch sleeve or cylinder.

Fig. 6 is a perspective view of one of the clutch dogs.

As here shown, the gearing mechanism embodying this invention includes a driving shaft 10 and driven shaft 12 which is aligned with the driving shaft. Both of said shafts are suitably supported in bearings 14. A propeller shaft 16 is disposed beneath and in parallel relation with the driven shaft and is connected therewith through suitable gears 18 fixed to said driving and propeller shafts.

The clutch mechanism for connecting the driving and driven shafts positively together for conjoint rotation in the same direction includes a hub 20 which is fixed to the end of the driven shaft by a key 22. Said hub is provided with a radially outstanding flange 24 against the left end face of which is disposed a spur gear 26. A circular cover plate 28 is disposed against the outer face of said gear and said cover plate and gear are secured to the flange 24 by bolts 30 extended through the aforesaid elements, whereby said gear is positively connected to be in effect an integral part of the driven shaft. Said gear is provided with an internal annular passage 32 therein and a clutch sleeve or cylinder 34 fits closely but freely rotatable therein; and said cylinder is fixed to the driving shaft by a key 36. Said cylinder is provided with a plurality of notches 38, see Figs. 3 and 5, which are spaced equi-distant in and about the outer periphery thereof. Said notches are adapted to be entered by clutch or locking dogs carried by the gear 26 whereby to connect said cylinder positively with said gear 26 and thereby to directly connect said driving and driven shafts positively together for conjoint rotation in the same direction.

Said gear 26 is provided with a pair of clutch dogs, see Figs. 3 and 6, which are received in opposed recesses 40 in the inner face of said gear. Each clutch dog comprises an arm 42 which has a semi-circular end face or abutment 44 that is adapted to be received within a correspondingly shaped portion 46 of the recess 40 in said gear to have a pivotal or rocking bearing connection therewith. Said arm is provided with a cylindrical extension 48 at one side, which is a continuation, in part, of said semi-circular face 44. Said extension is journalled in an aperture in the flange 24, which extension, in combination with the cylindrical extension 48 provides a pivotal or rocking support for the clutch dog. Said arm 42 at its free end is provided with the jaw or abutment which extends below said arm 42 and is adapted, when one of the notches 38 in the cylinder 34 is disposed therebeneath, to enter the notch in the manner indicated in Fig. 2 and thereby positively to connect said cylinder and gear. The lower face 52 of said jaw is arcuate in form to conform with the cylindrical face of said cylinder 34 so that when the dog is disposed entirely within its recess in said gear, it is free from engagement with said cylinder and the cylinder can rotate independently of said gear. The lateral face 54 of said jaw is arcuate in form and the corresponding face of the recess 40 is correspondingly shaped so that the dog, while movable in said recess, cannot move materially lengthwise thereof. The arm 42 of said dog is approximately the width of the gear so that the flange 24 and cover plate 28 cooperate to hold the dog in its recess against lateral displacement. The jaws of both dogs are provided with lateral extensions 58 which extend freely through apertures 60 in the cover plate and are adapted to be engaged by operating mechanism hereinafter to be described to control the clutch operation. Said dogs are adapted to be urged constantly in a clutch engaging direction and, for this purpose, said cover plate 28 is formed with opposed bosses 62 therein aligned with the apertures 60 and extended axially of the plate. Said bosses are provided with internal passages 63 therein in which compression springs 64 are received. The outer ends of said springs bear against plugs 66 which are screw-threaded removably in said passages and the inner ends of said springs bear against pin 68 which engage the jaw-extensions 58 of the dogs whereby constantly to urge said dogs inwardly for engagement with the cylinder 34 of the driving shaft. It will be seen that when said dogs are held from engagement with the cylinder 34 of the driving shaft, as illustrated in Fig. 3, the driving and driven shafts are free from positive connection and that when restraint on said dogs is removed said springs 64 are free to urge said dogs inwardly and, when notches 38 in the cylinder 34 are properly aligned with the jaws of said dogs, to cause said dogs to enter said notches thereby to effect the positive locking engagement of said driving and driven shafts. The driving pressure is adapted to be against the faces 54 and 44 of said dogs.

Gearing mechanism and clutch mechanism similar to the above described mechanism are provided to connect said driving and driven shafts for reverse drive. To this end, a cylinder 34$^a$ similar to the cylinder 34 is fixed to the driving shaft by a key 70. A spur gear 72 closely surrounds and is rotatable about said cylinder. Said gear is clamped between a cover plate 28$^a$ and a flange 74 by bolts 76. Said flange 74 is loose on said driving shaft so that said gear 72 is normally loose thereon but said gear is restrained against axial movement on said shaft by said cylinder 34$^a$. Said loose gear 72 is provided with clutch dogs which are or may be identical with the previously described clutch dogs and the arrangement of the clutch mechanism is in all essential respects the same, so that it need not be further described.

Reverse drive is transmitted from the gear 72 to the driven shaft through a transmission shaft 78 which is parallel with said driving and driven shafts. A spur gear 80 is fixed to said driven shaft and is in constant mesh with the gear 72. A smaller spur gear 82 is fixed to said transmission shaft adjacent the gear 26 of the driven shaft but out of mesh therewith. Said gear 82 is in constant mesh with an idler or reversing gear 84 carried by shaft 86 and said reversing gear is in constant mesh with the gear 26 of said driven shaft. It is apparent that, when the reverse drive clutch mechanism is actuated to connect the gear 72 positively with the driving shaft, with the direct-drive clutch free, the drive will be transmitted through the transmission shaft and the reversing gear 84 to rotate the driven shaft in the opposite direction to the rotation of the driving shaft.

The operating mechanism for said direct and reverse drive clutch mechanisms includes a sleeve 90 which is freely rotatable and slidable on said driving shaft and is disposed between said clutch mechanisms. Said sleeve is adapted to be moved axially along said shaft by means including a pivoted operating lever 92 which is engageable with said sleeve intermediate its ends in a more or less common manner. Said sleeve is provided with cylindrical end portions 94 and 96 that are adapted to engage the end arcuate faces of the projections 58 of the clutch dogs and to hold said dogs out of clutching engagement with the driving shaft. The ends of said sleeve are conical as at 98 for the purpose of engaging said dogs and moving them outwardly out of driving position as said sleeve is moved axially. The length of said sleeve 90 is adapted to be such that when it is in one extreme position, it holds the dogs of one clutch mechanism free from driving position and just clears the dogs of the other clutch mechanism so that they will be held in full driving position by their respective springs.

The sleeve is also so arranged that when it is in mid position, it is in engagement with the dogs of both clutch mechanisms and holds both clutches in their disengaged positions so that the driving and driven shafts are free from positive driving connection and the mechanism thereby is in neutral position. Movement of the sleeve in opposite directions from the neutral position effects the disengagement of the clutch mechanism toward which the sleeve is moved. In the position of the mechanism illustrated in Fig. 1, the forward drive clutch mechanism is in disengaged position while the reverse drive clutch mechanism is in reverse position and the drive is through the transmission shaft to the gear 26 on the driven shaft and in a direction to reversely rotate the driven shaft. When the sleeve 90 is moved to its extreme left hand position, the reverse drive clutch mechanism is disengaged and the forward drive clutch mechanism is set to couple the shafts directly for forward drive and exclude the gearing mechanism.

I claim:

Reversing mechanism comprising the combination of aligned driving and driven shafts, a transmission shaft parallel with the aforesaid shafts, a pair of axially spaced sleeves on and fixed to said driving shaft, a loose gear surrounding one of said sleeves, reverse-drive clutch mechanism establishing a disengageable driving connection between said gear and sleeve, a second gear surrounding said other sleeve and fixed to said driven shaft, forward-drive clutch mechanism establishing a disengageable driving connection between said last gear and driving shaft, gears fixed to said transmission shaft connected with the aforesaid gears, a reversing gear meshing with said second gear and with one of said transmission shaft gears, said clutch mechanisms both having clutch dogs which rock in axially-extended passages in said gears and fit in notches in said sleeves to connect said gears and sleeves, housing plates overlying the opposite sides of both gears and constituting means to retain said dogs in operative position in said passages in said gears, said dogs of each clutch mechanism having arms which extend loosely through the confronting ones of said housing plates toward the other clutch mechanism and overlie and are spaced from said driving shaft, and a collar slidable on said shaft between said sleeves and under said arms of said dogs having tapered ends that engage said arms and move them outwardly to free the clutch mechanisms, said collar having such length that when in mid-position between said clutch mechanisms it is in engagement with the arms of all the dogs and holds them out of driving engagement with the driving shaft, thereby permitting the shafts to rotate independently of each other.

In testimony whereof, I have signed my name to this specification.

HENRY A. TUTTLE.